United States Patent
Krug

(10) Patent No.: US 6,877,870 B2
(45) Date of Patent: Apr. 12, 2005

(54) SENSOR-MIRROR ARRANGEMENT ON A WINDSHIELD

(75) Inventor: Martin Krug, Karlsruhe (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/388,604

(22) Filed: Mar. 17, 2003

(65) Prior Publication Data

US 2003/0179473 A1 Sep. 25, 2003

(30) Foreign Application Priority Data

Mar. 15, 2002 (DE) .......................................... 102 11 443

(51) Int. Cl.$^7$ .......................... G02B 7/182; B60R 1/04; B60S 1/08
(52) U.S. Cl. ...................... 359/871; 359/872; 318/483; 250/208.1; 250/573; 248/549; 73/170.17
(58) Field of Search ............................... 359/871, 872; 248/548, 549; 318/483; 250/208.1, 573; 73/170.17

(56) References Cited

U.S. PATENT DOCUMENTS

| | | | |
|---|---|---|---|
| 4,930,742 A | * | 6/1990 | Schofield et al. |
| 5,266,873 A | * | 11/1993 | Arditi et al. |
| 5,820,097 A | * | 10/1998 | Spooner |
| 6,066,933 A | * | 5/2000 | Ponzianna |
| 6,087,953 A | * | 7/2000 | DeLine et al. |
| 6,299,319 B1 | * | 10/2001 | Mertens |
| 6,313,454 B1 | * | 11/2001 | Bos et al. |
| 6,320,176 B1 | * | 11/2001 | Schofield et al. |
| 6,326,613 B1 | * | 12/2001 | Heslin et al. |
| 6,341,523 B2 | * | 1/2002 | Lynam |
| 6,593,565 B2 | * | 7/2003 | Heslin et al. |
| 6,681,163 B2 | * | 1/2004 | Stam et al. |
| 2003/0169522 A1 | * | 9/2003 | Schofield et al. |

FOREIGN PATENT DOCUMENTS

| | | |
|---|---|---|
| DE | 37 00 098 | 7/1988 |
| DE | 37 00098 A1 | 7/1988 |
| DE | 298 05 142 U1 | 6/1998 |
| DE | 198 46 969 A1 | 10/1999 |
| DE | 198 46 969 | 10/1999 |

OTHER PUBLICATIONS

European Search Report.

* cited by examiner

Primary Examiner—Ricky D. Shafer
(74) Attorney, Agent, or Firm—Crowell & Moring LLP

(57) ABSTRACT

A sensor-mirror arrangement on a windshield of a motor vehicle with an optical sensor that is fastened on the windshield in an edge region arranged between a free field of vision of the windshield and vehicle roof, and with an inside rearview mirror that is fastened using a mirror mounting in an upper edge region between the sensor and the vehicle roof. The mirror mounting has a first fastening element that interacts with a complementary second fastening element for fastening the inside rearview mirror, which is constructed with a mirror base of the inside rearview mirror. The mirror mounting moreover has a pedestal fastened on the windshield on its side facing away from the windshield the first fastening element is formed. The pedestal is dimensioned so that the mirror base fastened to the mirror holding has a predetermined distance from the windshield, which is greater that a minimum distance if need be required for the installation and/or function of the mirror base.

8 Claims, 3 Drawing Sheets

SENSOR-MIRROR ARRANGEMENT ON A WINDSHIELD

BACKGROUND AND SUMMARY OF THE INVENTION

This application claims the priority of 102 11 443.9, filed Mar. 15, 2002, the disclosure of which is expressly incorporated by reference herein.

The present invention concerns a sensor-mirror arrangement on a windshield of a motor vehicle.

Installing a rain sensor on a windshield of a motor vehicle with the aid of which a windshield wiper device can be controlled is known from German Reference DE 198 46 969 A1. In order to be able to control wiper activity as needed with the help of the rain sensor, it is necessary to arrange the rain sensor on the windshield inside the wiping field of the windshield wiper device. Moreover, legal provisions must be observed that prohibit positioning a visual obstruction within a prescribed field of vision of the windshield. Correspondingly, a rain sensor of this type can be positioned, for example, in an upper edge region of the windshield that is situated between the free field of vision and a roof of the motor vehicle.

An inside rear view mirror is known from German Patent DE 37 00 098 C2 that is fastened with the aid of a mirror mounting to the windshield. Legal provisions must be heeded for installing this inside rear view mirror, as well. On the one hand, it is also true here that the mirror mounting may not be arranged in the free field of vision. Above and beyond this, the inside rear view mirror must be arranged in the motor vehicle interior so that it has a prescribed angle of view geometry that ensures that a standardized standard motor vehicle driver can monitor a prescribed minimum field of view through the inside rear view mirror.

Usually, a mirror mounting which is fastened independently of the inside rear view mirror on the windshield, especially using a cement, is used to fasten the inside rear view mirror on the windshield. A first fastening element is constructed on this mirror mounting that is formed in known inside rear view mirrors through two strips projecting laterally on opposite sides of a foundation, whereby an undercut is formed between these strips and the windshield surface. A mirror base of the inside rear view mirror possesses a second fastening element that is constructed complementary to and interacting with the first fastening element for fastening the inside rear view mirror to the mirror mounting. With known inside rear view mirrors, the second fastening element is formed by a flat spring that reaches behind the strips with inwardly bent end segments. Moreover, the mirror mounting is dimensioned such that the mirror base fastened on it has a minimum distance from the surface of the windshield. This minimum distance guarantees that the mirror base can detach from the mirror mounting in the event of a disturbance, for example, in the event of a crash, in order to prevent injuries. Furthermore, this minimum distance is necessary for a comfortable installation of the mirror base on the mirror mounting.

It can be desirable for various reasons to arrange the sensor and the inside rear view mirror as close alongside each other as possible. Moreover, there exists a wish to outfit motor vehicles that are regularly outfitted with an inside rear view mirror, optionally also with a sensor, especially light and/or rain sensor. In certain motor vehicles, the mirror mounting is arranged in the wiping field of the windshield wiper arrangement to obtain a specified angle of view geometry. The installation of a sensor can be problematic if the sensor gets into the free field of vision when installed beneath the standard position of the mirror mounting and moves out of the wiping field when installed above the mass production arrangement, and a positioning of the sensor alongside the mirror mounting is not desired. A shifting of the mass production inside rear view mirror upward along the windshield in order then to be able to mount the sensor below the inside rear view mirror in the wiping field does not promote the objective since the inside rear view mirror then no longer possesses the prescribed angle of view geometry in the new spatial bearing.

The present invention deals with the problem of disclosing an improved design for a sensor-mirror of the type mentioned at the beginning, which in particular makes possible a better utilization of the mounting space.

The invention is based on the general idea of placing the first fastening element of the mirror mounting at a distance from the windshield using a pedestal when moving the mirror mounting along the windshield. In this way, it is possible to correct the spatial bearing with an inside rear view mirror that leaves the prescribed angle of view geometry when moved upward so that the inside rear view mirror once again possesses the necessary angle of view geometry. In this way, it is possible, with restricted available space, to arrange the sensor below the mirror mounting on the windshield. Because this structure can use a typical, standard inside view mirror, conversion from an outfitting variant without sensor to an outfitting variant without a sensor can be especially economically realized. In particular, reconstruction of the inside rear view mirror is not necessary.

It is evident that the aforementioned features still to be explained below can be used not only in the respectively indicated combination, but also in other combinations or alone without leaving the framework of the present invention.

Further important features and advantages of the invention emerge from the dependent claims, from the drawings and from the associated description of the figures on the basis of the drawings.

Other objects, advantages and novel features of the present invention will become apparent from the following detailed description of the invention when considered in conjunction with the accompanying drawings.

A preferred design of the invention is represented in the drawings and will be explained in greater detail in the description below whereby the identical reference numbers relate to identical or functionally identical or similar components.

DETAILED DESCRIPTION OF THE PREFERRED EMBODIMENTS

Figure 1:
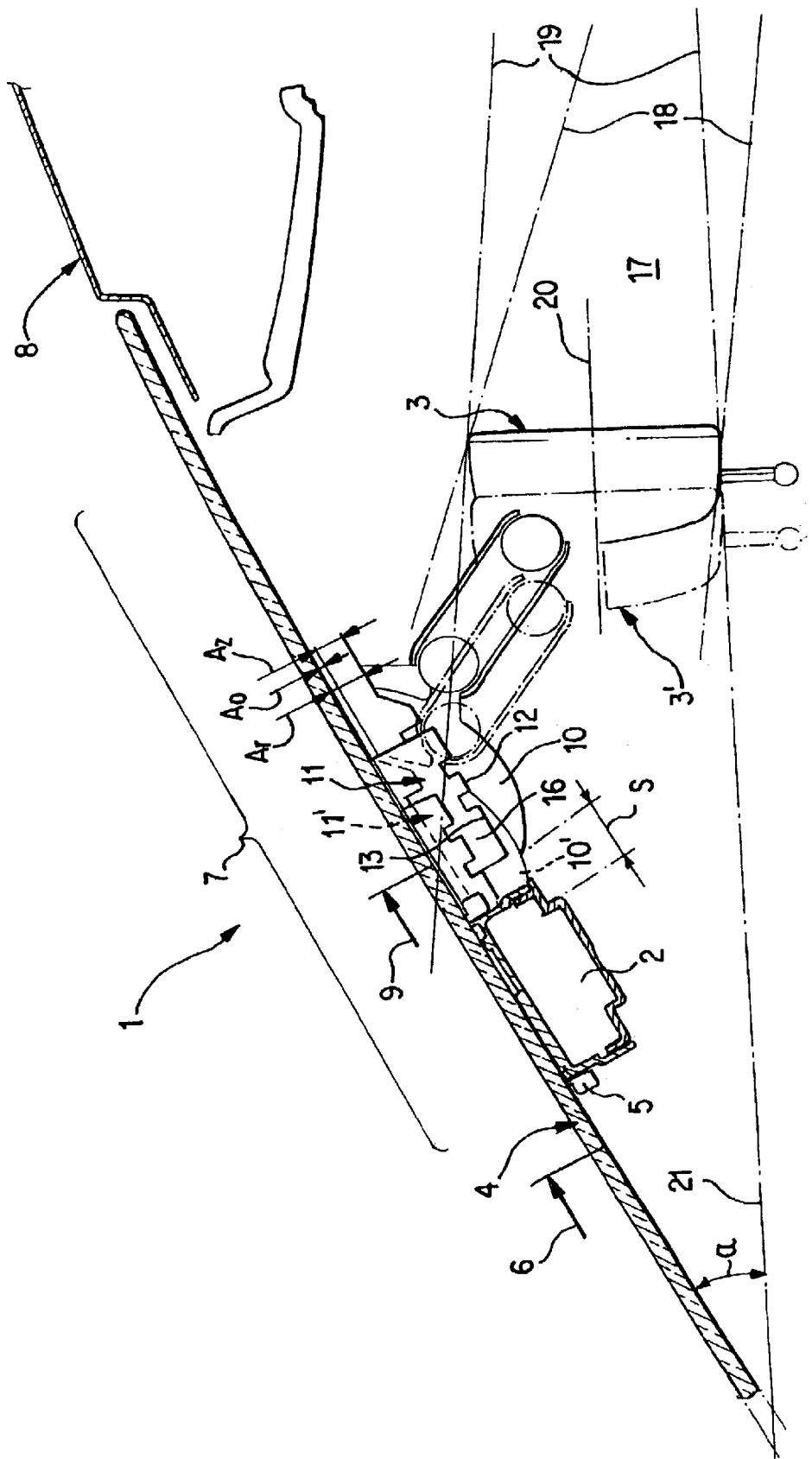
FIG. 1 is greatly simplified longitudinal section through a sensor-mirror arrangement of the invention.

Corresponding to FIG. 1, a sensor-mirror arrangement 1 of the invention includes at least one optical sensor 2 and an inside rear view mirror 3. The sensor 2 can be, for example, a rain and/or light sensor that is mounted on the windshield 4 of a motor vehicle, especially a passenger car, to fulfill its function. For this purpose, the arrangement 1 includes a sensor mounting 5 which serves for positioning and fixation of the sensor 2.

The windshield 4 possesses a visual field 6 the upper limit of which is marked in FIG. 1 by an arrow. No obstructing impediment may be arranged in this visual field 6, and inside rear view mirrors 3 may not be fastened to the windshield 4 inside this visual field 6. An upper edge region 7 joins above this field of vision 6 which in FIG. 1 is characterized by a brace and extends up to a motor vehicle roof 8. A windshield wiper device (not depicted) allocated to the windshield 4 possesses a wiping area 9 the upper boundary of which is marked in the section of FIG. 1 with an arrow. This wiping area 9 consequently extends beyond the visual field 6 up into the upper edge region 7.

In order for the sensor 2 to fulfill its function, it must be positioned inside the wiping field 9 on the windshield 4.

The inside rear view mirror 3 possesses a mirror base 10 that is connected with a mirror mounting 11. This mirror mounting 11 is for its part fastened on the windshield 4, whereby the mirror mounting 11 is likewise arranged in the upper edge region 7, but staggered upwardly along the windshield 4 in relation to the sensor. The mirror mounting 11 has a first fastening element 12 for fastening the inside rear view mirror 3 that interacts with a complementary secondary fastening element 13 constructed on the mirror base 10.

Figure 2:
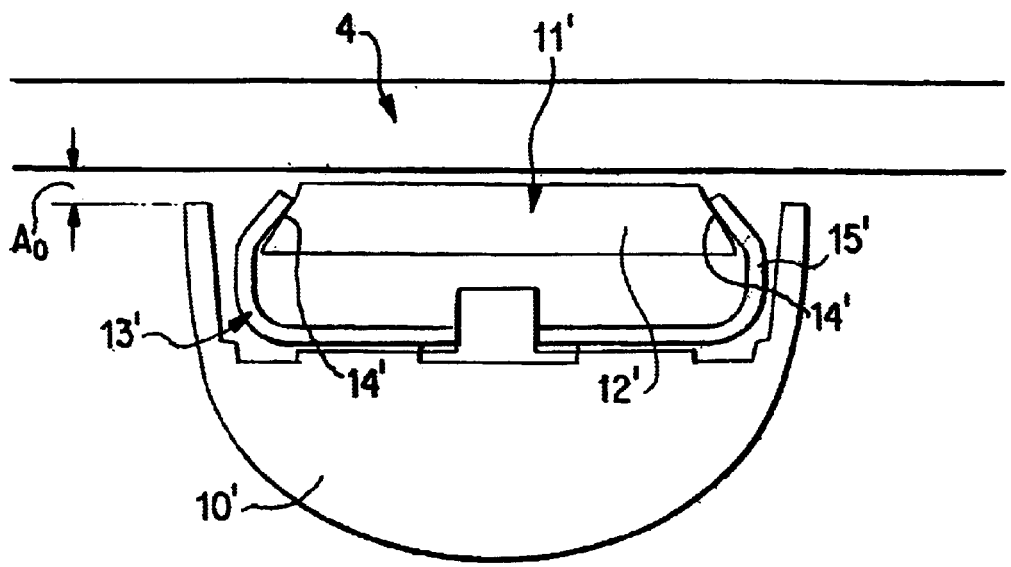
FIG. 2 is further simplified cross section through a mirror mounting according to the state of the art.

The construction of the mirror mounting 11 in accordance with the invention will be explained below on the basis of FIGS. 1 to 3. In FIG. 2, a mirror mounting 11' is represented as it is known on the basis of the state of the art, cf. German Patent DE 37 00 098 C2. The first fastening element 12' possesses lateral flanks 14' which form an undercut toward the windshield 4. The second fastening element 13' possesses a spring clip 15' which laterally embraces the flanks 14'. The mirror base 10' is fixed into position with the aid of these fastening elements 12' and 13' on the mirror mounting 11' such that the inside rear view mirror can detach from the mirror mounting 11' in the event of an impermissibly high action of force, for example, in the case of a crash, in order to avoid severe injuries to the vehicle occupants. In order to guarantee this function, the mirror base 10 possess a minimum distance $A_0$ in relation to the windshield 4.

Figure 3:
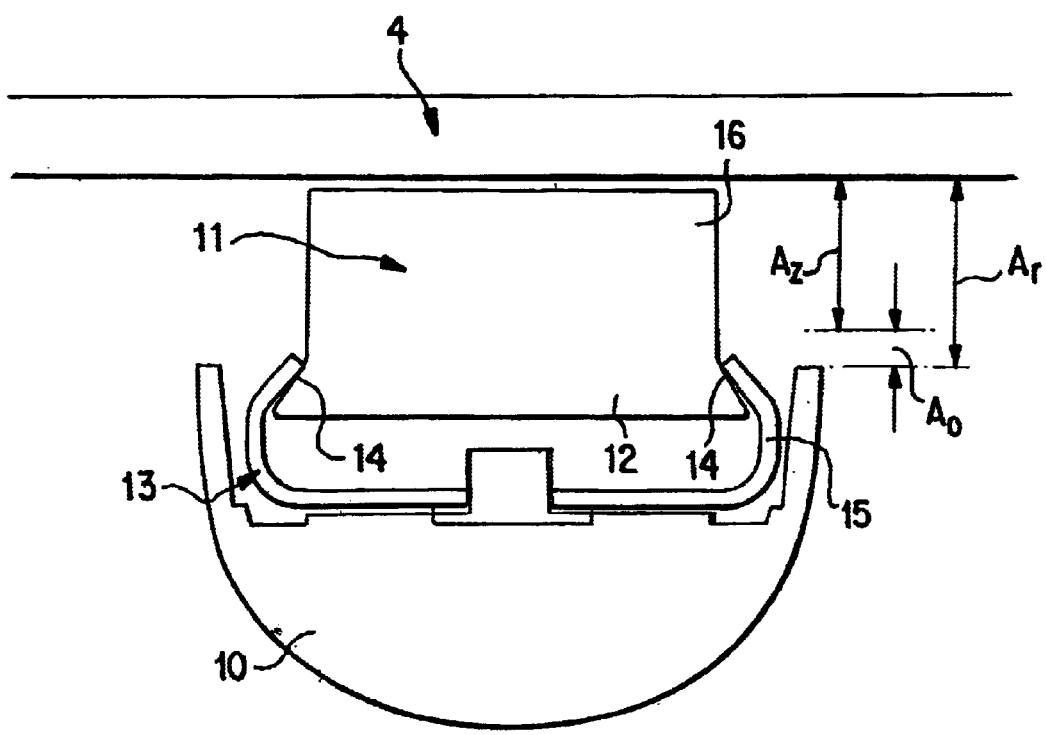
FIG. 3 shows a cross section as in FIG. 2, but according to the invention.

In accordance with FIG. 3, the mirror mounting of the invention 11 basically possesses the same fastening element 12 and is likewise outfitted with the two flanks 14 on which the known spring clip 15 engages. As distinct from the mirror mounting 11' in accordance with FIG. 2, the mirror mounting 11 of the invention in accordance with FIG. 3 possesses a pedestal 16 that is fastened on the windshield 4 and that has the first fastening element 12 on its side facing away from the windshield 4. As distinct from the state of the art in accordance with FIG. 2, the first fastening element 12 is consequently not directly fastened to the windshield 4, but rather indirectly through the pedestal 16, especially by gluing. Through the dimensioning of this pedestal 16 crosswise in relation to the windshield 4, an additional distance $A_z$ results for the mirror base 10 which is added to the minimal distance $A_0$. Correspondingly there arises in accordance with the invention for the mirror base a resulting distance $A_z$ between the mirror base 10 and the windshield 4 which here is significantly greater than the minimum distance $A_0$ in accordance with the state of the art from FIG. 2.

This connection is also reproduced in FIG. 1 whereby the positioning of the inside rearview mirror 3 according to the invention is represented in solid lines, while the traditional arrangement is represented with dotted lines.

The invention proceeds, for example, from a motor vehicle which is delivered in a standard outfitting without the sensor 2. The mass production inside rearview mirror 3' is designed for this standard case. The inside rear view mirror 3 is arranged with the aid of the traditional mirror mounting 11' in accordance with FIG. 2 on the windshield so that it occupies a spatial bearing in the vehicle interior 17 in which the inside rear view mirror 3' has a prescribed angle of view geometry. This angle of view geometry is specified by two extreme visual fields 18 and 19, which in each case characterize an extreme eye height position in which a prescribed minimum view toward the rear must be guaranteed by the inside rearview mirror 3, 3'. In this initial position, the mirror mounting 11' is at least partially situated in the wiping field 9. The mirror base 10' possesses the minimum distance $A_0$ from the windshield 4 in this initial position.

The vehicle is now to be outfitted with the sensor 2 for an outfitting variant. For this, the position of the mirror mounting 11 must be shifted upward along the windshield 4 in order to create sufficient space for accommodating the sensor 2 within the wiping field 9 so that the latter in no case projects into the field of vision 6. The spatial bearing of the inside rearview mirror 3, 3' changes owing to moving the mirror mounting 11 such that the inside rear view mirror 3, 3' no longer possesses the prescribed field of view geometry. Here the invention comes to bear in that the mirror mounting 11 of the invention is used that forms the additional distance $A_z$ for the mirror base 10 with its pedestal 16. By a suitable dimensioning of the pedestal 16, the spatial bearing of the inside rearview mirror 3 can in this way be corrected to the extent that the inside rearview mirror 3 once again possesses the prescribed field of view geometry. The particular charm of the arrangement 1 of the invention lies in that the same inside rearview mirror 3,3' can be used for both outfitting variants depicted.

As is particularly apparent from FIG. 1, the dimensioning of the pedestal 16 is selected so that the inside rearview mirror 3 is arranged approximately at the same level 20 in the vehicle interior 17 in the end position, which results with outfitting variants with sensor 2 as in the initial position in which the vehicle does not possess the sensor 2.

The dimensioning of the pedestal 16 appropriately takes place such that the spatial distance $A_z$ obtained in the end position approximately corresponds to a stretch S multiplied by the tangent of an angle of inclination $\alpha$. Stretch S moreover is the value about which the mirror mounting 11 is upwardly displaced along the windshield 4 in the end position in relation to the mirror mounting 11' in the initial position. The angle $\alpha$ is here the angle of inclination of the windshield 4 in relation to a horizontal plane 21.

Figure 4:
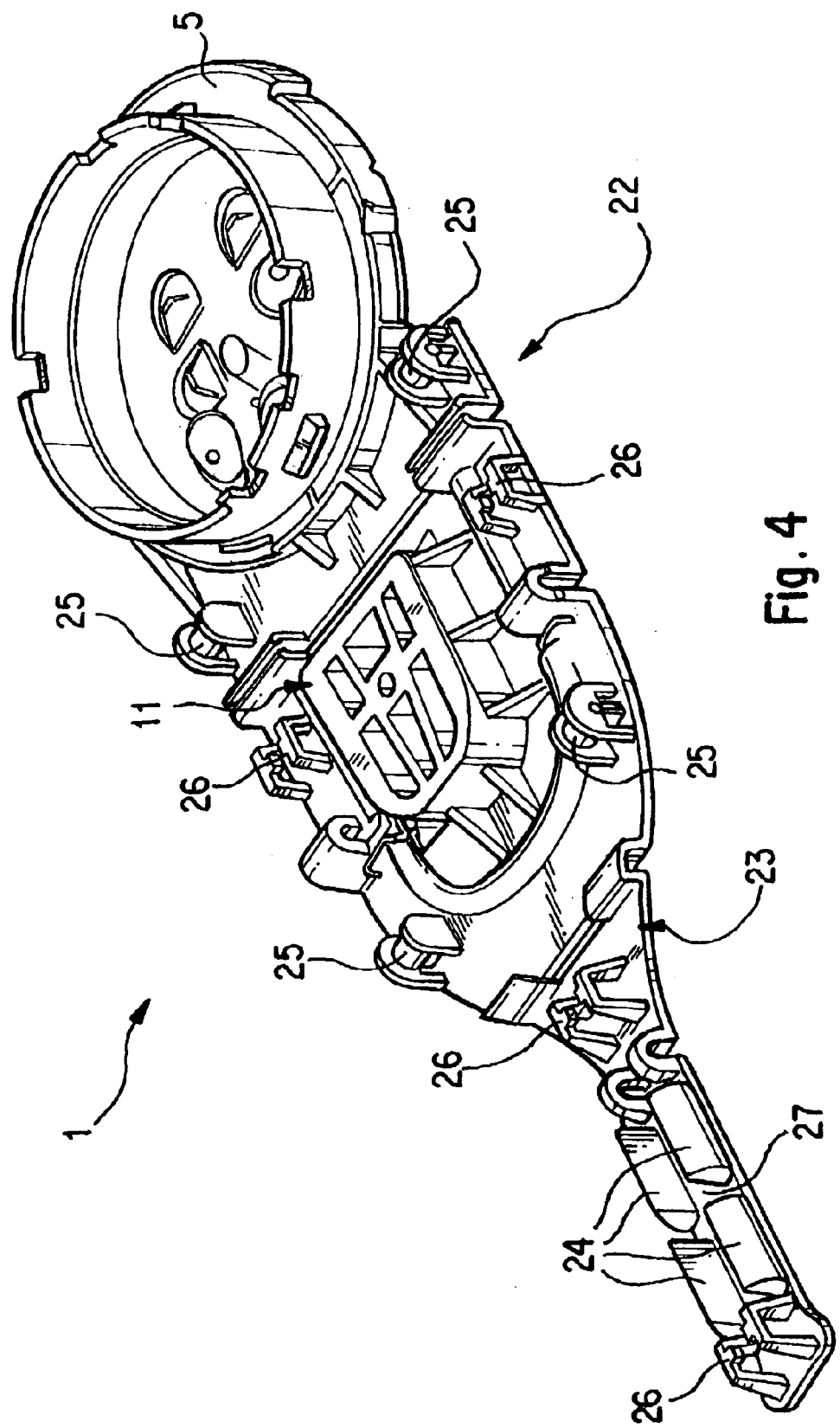
FIG. 4 is a perspective view of a combined mounting according to the invention.

According to FIG. 4, the sensor mounting 5 and the mirror mounting 11 can be combined into a one part or one piece combined mounting 22 in a preferred design of the arrangement 1 of the invention. In this way the installation of the two holders 5, 11 on the windshield 4 can be considerably simplified. At the same time, a predetermined relative position is constantly maintained relatively exactly between sensor mounting 5 and mirror mounting With the design depicted in FIG. 4, a cover mounting 23 is moreover incorporated into the combined mounting 22 with the aid of which a one part or multiple parts covering not depicted here can be fastened on the combined mounting 22. This cover can serve as a visual protection for the components concealed under it. To fix the cover in position, the cover mounting 23 possesses a latching hook 24 on which the cover or a cover element can be clipped. Furthermore, retaining pegs 25 are provided on which the cover or another cover element can be clipped with appropriate clamps, for example, Σ clips. Above and beyond this, cable holders 26 are provided which facilitate the positioning of cables and lines on the combined mounting 22. The latching hooks 24 are moreover arranged such that they form a cable channel 27 between themselves in which the cables and lines can be passed from the components of the arrangement 1 to the vehicle roof 8.

In connection with the combined mounting 22 depicted in FIG. 4, the arrangement of the invention 1 forms a largely preassemblable unit that can be especially easily installed on the windshield 4. In particular, the combined mounting 22 offers a relatively large surface on its underside facing away from the viewer, which is available for attaining a durable secure adhesion.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sensor-mirror arrangement for a vehicle windshield, said arrangement comprising:

an optical sensor fastened by a sensor mounting in an upper edge region of the windshield inside a wiping field of a windshield wiper device on the windshield, said optical sensor and sensor mounting being arranged between a free field of vision of the windshield and a vehicle roof, an inside rearview mirror fastened on the windshield using a mirror mounting in the upper edge region between the sensor and the vehicle roof, said mirror mounting including a first fastening element that interacts with a complementary second fastening element, said second fastening element constructed on a mirror base of the inside rearview mirror, said mirror mounting also including a pedestal fastened on the windshield, wherein the first fastening element is constructed on a side of said pedestal facing away from and distal from the windshield and which is dimensioned so that the mirror base, when fastened on the mirror mounting is a predetermined distance from the windshield, which predetermine distance is greater than a minimum distance necessary without said pedestal for the proper installation and function of the mirror base.

2. The arrangement according to claim 1, wherein the predetermined distance between windshield and mirror base is selected such that the inside rearview mirror occupies a spatial bearing in the interior of the vehicle, said bearing having a prescribed angle of view geometry.

3. The arrangement according to claim 1, wherein the predetermined distance of the mirror base from the windshield corresponds to a resulting distance which is formed by the sum of said minimum distance and an additional distance, whereby the minimum distance is determined when said mirror is fastened on the windshield in an initial position using a mirror base, which is outfitted without said pedestal, the mirror having a spatial bearing in the vehicle interior with a predetermined angle of view geometry, and whereby the resulting distance is determined when the mirror is fastened on the windshield in an end position which is staggered in relation to the initial position by a stretch distance along the windshield toward the vehicle roof and in which the mirror occupies a spatial bearing in the vehicle interior in which it again has said predetermined angle of view geometry.

4. The arrangement according to claim 3, wherein the inside rear view mirror is arranged in the vehicle interior in a final position approximately on the same vertical level as in the initial position.

5. The Arrangement according to claim 3, wherein the additional distance approximately corresponds to the stretch multiplied by the tangent of the angle of inclination ($\alpha$) of the windshield in relation to a horizontal plane.

6. The arrangement according to one of claim 1, wherein a one part cover is provided which is fastened on the windshield using a cover mounting in a region of the sensor mounting and the mirror mounting and forms, in the vehicle interior, a vision protection casing for the sensor and the fastening elements of the inside rearview mirror.

7. The arrangement according to claim 6, wherein at least two from the cover mounting, the mirror mounting and the sensor mounting are combined into a one part or one piece combined mounting.

8. A vehicle windshield sensor mirror device comprising:

a sensor on a sensor mounting mounted on an upper edge region of the windshield within a wiping field covered by a windshield wherein said upper edge region is between a free field of vision by a driver of said vehicle and a roof of said vehicle;

a mirror mounting fastened at one side to said windshield between the sensor and the vehicle roof and fastened on another side to a rearview mirror, said mirror mounting including;

a fastening arrangement constructed on a mirror base of the inside rearview mirror;

a pedestal fastened on the windshield wherein the fastening arrangement is constructed on a side of said pedestal facing away from and distal from said windshield and wherein said pedestal has a thickness so that the mirror is properly aligned the same as an installation without said pedestal.

* * * * *